United States Patent
Sinha et al.

(10) Patent No.: US 12,189,943 B2
(45) Date of Patent: Jan. 7, 2025

(54) CLUSTER NAMESPACE FOR A MEMORY DEVICE

(71) Applicant: Micron Technology, Inc., Boise, ID (US)

(72) Inventors: Gaurav Sinha, Oberschleißheim (DE); Marco Redaelli, Munich (DE)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/048,251

(22) Filed: Oct. 20, 2022

(65) Prior Publication Data

US 2024/0134519 A1 Apr. 25, 2024
US 2024/0231610 A9 Jul. 11, 2024

(51) Int. Cl.
*G06F 3/00* (2006.01)
*G06F 3/06* (2006.01)

(52) U.S. Cl.
CPC .......... *G06F 3/0604* (2013.01); *G06F 3/0607* (2013.01); *G06F 3/0619* (2013.01); *G06F 3/0631* (2013.01); *G06F 3/0644* (2013.01); *G06F 3/0659* (2013.01); *G06F 3/0673* (2013.01); *G06F 3/0679* (2013.01)

(58) Field of Classification Search
CPC .. G06F 12/023; G06F 12/0246; G06F 12/109; G06F 12/0292; G06F 3/0607; G06F 3/0644; G06F 3/0679; G06F 3/0619; G06F 3/0659; G06F 3/0673; G06F 9/5077
See application file for complete search history.

(56) References Cited

U.S. PATENT DOCUMENTS 5,388,083 A * 2/1995 Assar .................... G06F 3/0601
365/185.11
7,330,971 B1 * 2/2008 Kukreja .................. H04L 63/20
713/168

(Continued)

FOREIGN PATENT DOCUMENTS

WO WO2002019334 A2 * 3/2002
WO WO2012083308 A2 * 6/2012

(Continued)

OTHER PUBLICATIONS

Miaocai et al., "FlatFS:FlattenHierarchicalFileSystemNamespaceonNon-volatileMemories", USENIX Annual Technical Conference, Jul. 2022, pp. 899-914.*

(Continued)

*Primary Examiner* — Srirama Channavajjala
(74) *Attorney, Agent, or Firm* — Harrity & Harrity, LLP

(57) ABSTRACT

Implementations described herein relate to a cluster namespace for a memory device. In some implementations, a memory device may receive a cluster namespace instruction, from a host device, that instructs the memory device to create a cluster namespace using memory resources of the memory device that are spread across a plurality of namespaces of the memory device. The memory device may identify namespace storage information that indicates memory resources associated with a plurality of namespaces of the memory device. The memory device may create the cluster namespace based on creating a plurality of extents that respectively map sets of logical block address ranges from the plurality of namespaces to the cluster namespace.

25 Claims, 9 Drawing Sheets

(56) References Cited

U.S. PATENT DOCUMENTS

| | | | |
|---|---|---|---|
| 7,791,952 B2 * | 9/2010 | Roohparvar | G06F 12/04 |
| | | | 365/185.11 |
| 8,276,042 B2 * | 9/2012 | Asnaashari | G06F 11/1012 |
| | | | 714/763 |
| 9,043,567 B1 * | 5/2015 | Modukuri | G06F 3/067 |
| | | | 711/162 |
| 9,785,356 B2 * | 10/2017 | Huang | G06F 13/387 |
| 10,095,413 B2 * | 10/2018 | Kohara | G06F 3/0655 |
| 10,310,925 B2 * | 6/2019 | Dubeyko | G06F 16/122 |
| 2008/0114854 A1 * | 5/2008 | Wong | G06F 16/184 |
| | | | 709/214 |
| 2011/0106802 A1 * | 5/2011 | Pinkney | G06F 16/184 |
| | | | 707/E17.054 |
| 2017/0123976 A1 * | 5/2017 | Motwani | H04L 9/14 |
| 2018/0189000 A1 * | 7/2018 | Li | G06F 3/0608 |
| 2018/0260334 A1 * | 9/2018 | Asano | G06F 12/0246 |
| 2019/0042144 A1 * | 2/2019 | Peterson | G06F 3/0635 |
| 2019/0121570 A1 * | 4/2019 | Kim | G06F 3/0688 |
| 2019/0146931 A1 * | 5/2019 | Frolikov | G06F 3/0679 |
| | | | 713/193 |
| 2019/0272118 A1 * | 9/2019 | Jin | G06F 3/0659 |
| 2020/0192592 A1 * | 6/2020 | Song | G06F 12/0284 |

FOREIGN PATENT DOCUMENTS

| | | | |
|---|---|---|---|
| WO | WO2017175078 A1 * | 10/2017 | |
| WO | WO2021055469 A1 * | 3/2021 | |

OTHER PUBLICATIONS

SAP AG BC Namespaces and Naming Convertions (BC-CTS-NAM), release 4.6C, Apr. 2001, pp. 1-26.*

* cited by examiner

CLUSTER NAMESPACE FOR A MEMORY DEVICE

TECHNICAL FIELD

The present disclosure generally relates to memory devices, memory device operations, and, for example, to a cluster namespace for a memory device.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, an electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

DETAILED DESCRIPTION

Figure 1:
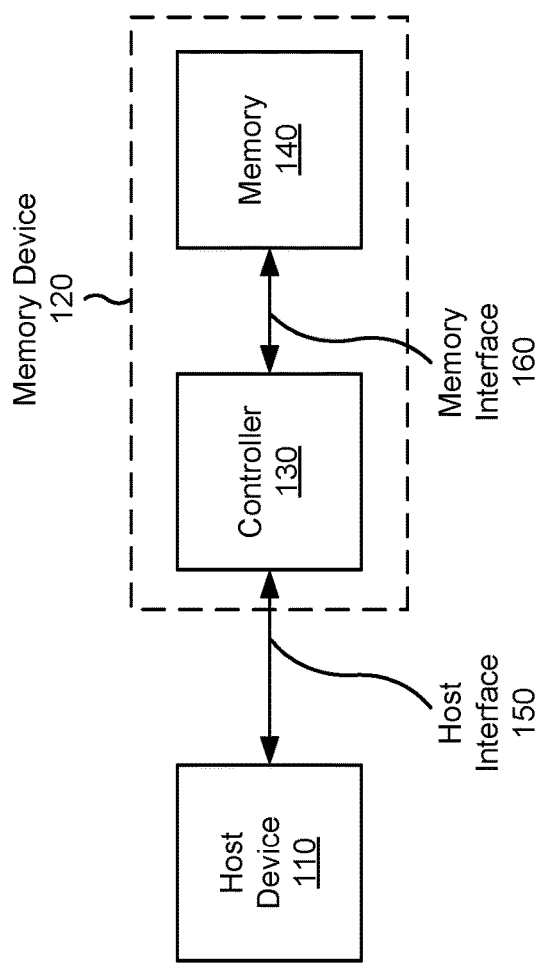
FIG. 1 is a diagram illustrating an example system capable of cluster namespace configuration for a memory device.

A namespace may be a quantity of non-volatile memory that is formatted into logical blocks. A memory device may support multiple namespaces, and each namespace may be associated with a namespace identifier. The memory device may create, delete, or otherwise manage the namespaces. For example, the memory device may receive an instruction from a host device that instructs the memory device to create a namespace or to delete a namespace. A namespace data structure may indicate capabilities or settings that are associated with the namespace. In some cases, the capabilities or settings that are associated with the namespace may be reported by the memory device to the host device.

The memory device may equip the host device with a mechanism to group similar sets of data together into a namespace and to create multiple namespaces. However, the memory device may not provide an easy way for resizing the namespace after the initial configuration of the namespace. This may require the host device (or a user of the host device) to determine the size of the namespace during an initial configuration of the namespace. This may be a bottleneck in memory device operations, particularly for systems, such as automotive systems, that offer shared namespaces across multiple host devices or multiple virtual machines. When the size of the namespace is fixed (non-adjustable) and when multiple devices are accessing the namespace, the usage of the namespace may not be deterministic and may be prone to errors.

Some implementations described herein enable a cluster namespace for a memory device. A cluster namespace may be a quantity of non-volatile memory that includes memory resources from one or more namespaces. A host device may determine to create a cluster namespace and may identify cluster namespace information that indicates one or more characteristics of the cluster namespace to be created, such as a size of the cluster namespace. The host device may transmit a cluster namespace instruction that instructs a memory device to create the cluster namespace using memory resources of the memory device that are spread across multiple namespaces of the memory device. For example, the cluster namespace instruction may instruct the memory device to create the cluster namespace using memory resources from a first namespace and memory resources from a second namespace. The memory device may create the cluster namespace based on the cluster namespace instruction received from the host device. For example, the memory device may create the cluster namespace using a first set of memory resources associated with the first namespace and a second set of memory resources associated with the second namespace. In some implementations, the memory device, to create the cluster namespace, may create a first extent that maps a first set of logical block address (LBA) ranges from the first namespace to the cluster namespace and may create a second extent that maps a second set of LBA ranges from the second namespace to the cluster namespace.

In some implementations, the host device may instruct the memory device to create a plurality of cluster namespaces that respectively correspond to a plurality of applications or functions of the host device. For example, the host device may instruct the memory device to create a first cluster namespace to be used for a music application of the host device and may instruct the memory device to create a second cluster namespace to be used for a gaming application of the host device. In some implementations, the cluster namespaces may be adjustable. The host device may instruct the memory device to increase or decrease a size of a cluster namespace. For example, the host device may instruct the memory device to increase a number of memory resources that are allocated to the first cluster namespace and/or to decrease the number of memory resources that are allocated to the second cluster namespace. As a result, namespace storage associated with the memory device can be adjusted based on adapting needs of the host device. This may reduce or eliminate wasted memory resources and errors caused by non-adjustable namespaces.

FIG. 1 is a diagram illustrating an example system 100 capable of a cluster namespace for a memory device. The system 100 may include one or more devices, apparatuses, and/or components for performing operations described herein. For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

The memory device 120 may be any electronic device or apparatus configured to store data in memory. In some implementations, the memory device 120 may be an electronic device configured to store data persistently in non-volatile memory. For example, the memory device 120 may be a hard drive, a solid-state drive (SSD), a flash memory device (e.g., a NAND flash memory device or a NOR flash memory device), a universal serial bus (USB) thumb drive, a memory card (e.g., a secure digital (SD) card), a secondary storage device, a non-volatile memory express (NVMe) device, and/or an embedded multimedia card (eMMC) device. In this case, the memory 140 may include non-volatile memory configured to maintain stored data after the memory device 120 is powered off. For example, the memory 140 may include NAND memory or NOR memory. In some implementations, the memory 140 may include volatile memory that requires power to maintain stored data and that loses stored data after the memory device 120 is powered off, such as one or more latches and/or random-access memory (RAM), such as dynamic RAM (DRAM) and/or static RAM (SRAM). For example, the volatile memory may cache data read from or to be written to non-volatile memory, and/or may cache instructions to be executed by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include a memory controller, a system controller, an ASIC, an FPGA, a processor, a microcontroller, and/or one or more processing components. In some implementations, the controller 130 may be a high-level controller, which may communicate directly with the host device 110 and may instruct one or more low-level controllers regarding memory operations to be performed in connection with the memory 140. In some implementations, the controller 130 may be a low-level controller, which may receive instructions regarding memory operations from a high-level controller that interfaces directly with the host device 110. As an example, a high-level controller may be an SSD controller, and a low-level controller may be a non-volatile memory controller (e.g., a NAND controller) or a volatile memory controller (e.g., a DRAM controller). In some implementations, a set of operations described herein as being performed by the controller 130 may be performed by a single controller (e.g., the entire set of operations may be performed by a single high-level controller or a single low-level controller). Alternatively, a set of operations described herein as being performed by the controller 130 may be performed by more than one controller (e.g., a first subset of the operations may be performed by a high-level controller and a second subset of the operations may be performed by a low-level controller).

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some implementations, the memory device 120 and/or the controller 130 may be configured to receive a cluster namespace instruction, from a host device, that instructs the memory device to create a cluster namespace using memory resources of the memory device that are spread across a plurality of namespaces of the memory device; identify namespace storage information that indicates one or more memory resources of a first namespace of the memory device and one or more memory resources of a second namespace of the memory device; and create the cluster namespace based on the cluster namespace instruction and the namespace storage information, wherein the one or more components, to create the cluster namespace, are configured to create a first extent that maps a first set of LBA ranges from the first namespace to the cluster namespace and a second extent that maps a second set of LBA ranges from the second namespace to the cluster namespace.

In some implementations, the host device 110 may be configured to obtain namespace storage information that indicates a plurality of memory resources associated with a plurality of namespaces of a memory device; determine a cluster namespace and cluster namespace information that indicates a size of the cluster namespace; and transmit a cluster namespace instruction, to the memory device based on the namespace storage information and the cluster namespace information, that instructs the memory device to create the cluster namespace, wherein the cluster namespace instruction instructs the memory device to create the cluster namespace using one or more memory resources of a first namespace of the memory device and one or more memory resources of a second namespace of the memory device.

In some implementations, the memory device 120 and/or the controller 130 may be configured to receive, from a host device, a cluster namespace instruction that instructs the memory device to create a cluster namespace; allocate a first set of memory resources from a first namespace of the memory device to the cluster namespace; and allocate a second set of memory resources from a second namespace of the memory device to the cluster namespace.

As indicated above, FIG. 1 is provided as an example. Other examples may differ from what is described with regard to FIG. 1.

Figure 2:
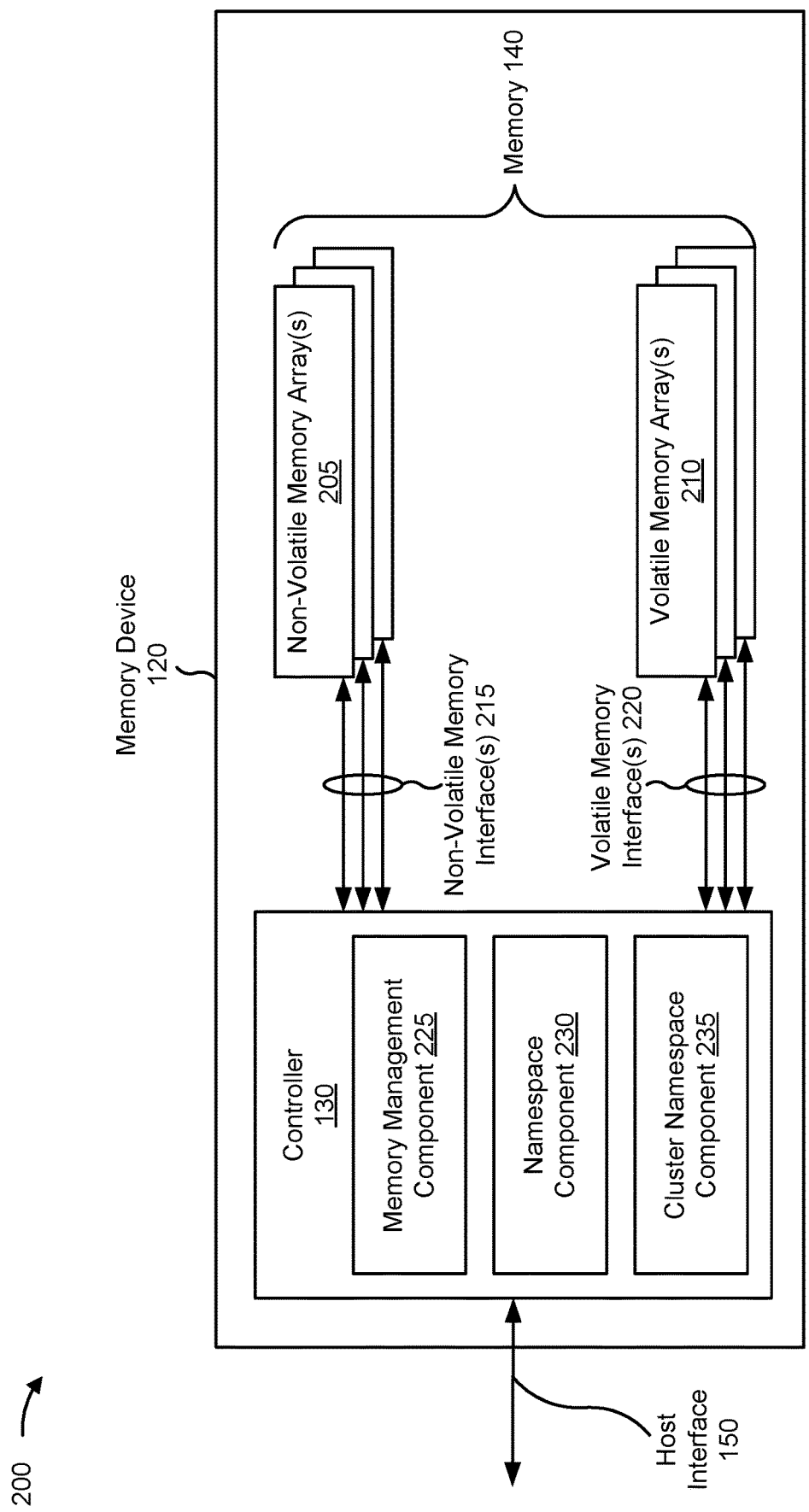
FIG. 2 is a diagram of example components included in a memory device.

FIG. 2 is a diagram of example components 200 included in a memory device 120. As described above in connection with FIG. 1, the memory device 120 may include a controller 130 and memory 140. As shown in FIG. 2, the memory 140 may include one or more non-volatile memory arrays 205, such as one or more NAND memory arrays and/or one or more NOR memory arrays. Additionally, or alternatively, the memory 140 may include one or more volatile memory arrays 210, such as one or more SRAM arrays and/or one or more DRAM arrays. The controller 130 may transmit signals to and receive signals from a non-volatile memory array 205 using a non-volatile memory interface 215. The controller 130 may transmit signals to and receive signals from a volatile memory array 210 using a volatile memory interface 220.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 225, a namespace component 230, and/or a cluster namespace component 235. In some implementations, one or more of these components are implemented as one or more instructions (e.g., firmware) executed by the controller 130. Alternatively, one or more of these components may be implemented as dedicated integrated circuits distinct from the controller 130.

The memory management component 225 may be configured to manage performance of the memory device 120. For example, the memory management component 225 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 225, such as information regarding memory block age, memory block erase count, and/or error information associated with a memory partition (e.g., a memory cell, a row of memory, a block of memory, or the like).

The namespace component 230 may be configured to create one or more namespaces. As described herein, a namespace may be a quantity of non-volatile memory that is formatted into logical blocks. The namespace component 230 may create a namespace based on input received from the host device 110. For example, the host device 110 may instruct the memory device 120 to create the namespace, and the namespace component 230 may create the namespace based on the instruction from the host device 110. Additionally, or alternatively, the namespace component 230 and/or the memory device 120 may create the namespace or may be configured with the namespace without input from the host device 110. In some cases, the namespace may be associated with a namespace identifier. For example, the memory device 120 may determine an identifier associated with the namespace and may transmit an indication of the identifier to the host device 110. Additionally, or alternatively, the host device 110 may determine the identifier associated with the namespace and may transmit an indication of the identifier to the memory device 120.

The cluster namespace component 235 may be configured to create one or more cluster namespaces. As described herein, a cluster namespace may be a quantity of non-volatile memory that includes memory resources from one or more namespaces. In some cases, the cluster namespace may include memory resources from multiple namespaces. The cluster namespace component 235 may create a cluster namespace based on an instruction received from the host device 110. For example, the host device 110 may instruct the memory device 120 to create the cluster namespace, and the cluster namespace component 235 may create the cluster namespace based on the instruction from the host device 110. In some cases, a cluster namespace may be associated with a cluster namespace identifier and/or may be associated with a particular application or function of the host device 110. For example, a first cluster namespace may be associated with a music application of the host device 110 and a second cluster namespace may be associated with a gaming function of the host device 110. The first cluster namespace may include memory resources from a first set of namespaces and the second cluster namespace may include memory resources from a second set of namespaces. In some cases, the first set of namespaces may be the same as the second set of namespaces. In some other cases, the first set of namespaces may include at least one namespace that is not included in the second set of namespaces. The cluster namespace component 235 may be configured to manage the one or more cluster namespaces associated with the memory device 120. For example, the cluster namespace component 235 may be configured to delete a cluster namespace and/or to adjust a size of the cluster namespace, such as based on an instruction from the host device 110. In some cases, the cluster namespace component 235 may create the one or more cluster namespaces using one or more extents. Additional details regarding these features are described below.

One or more devices or components shown in FIG. 2 may be configured to perform operations described elsewhere herein, such as one or more operations and/or methods described in connection with FIG. 5. For example, the controller 130, the memory management component 225, the namespace component 230, and/or the cluster namespace component 235 may be configured to perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

Figure 3:
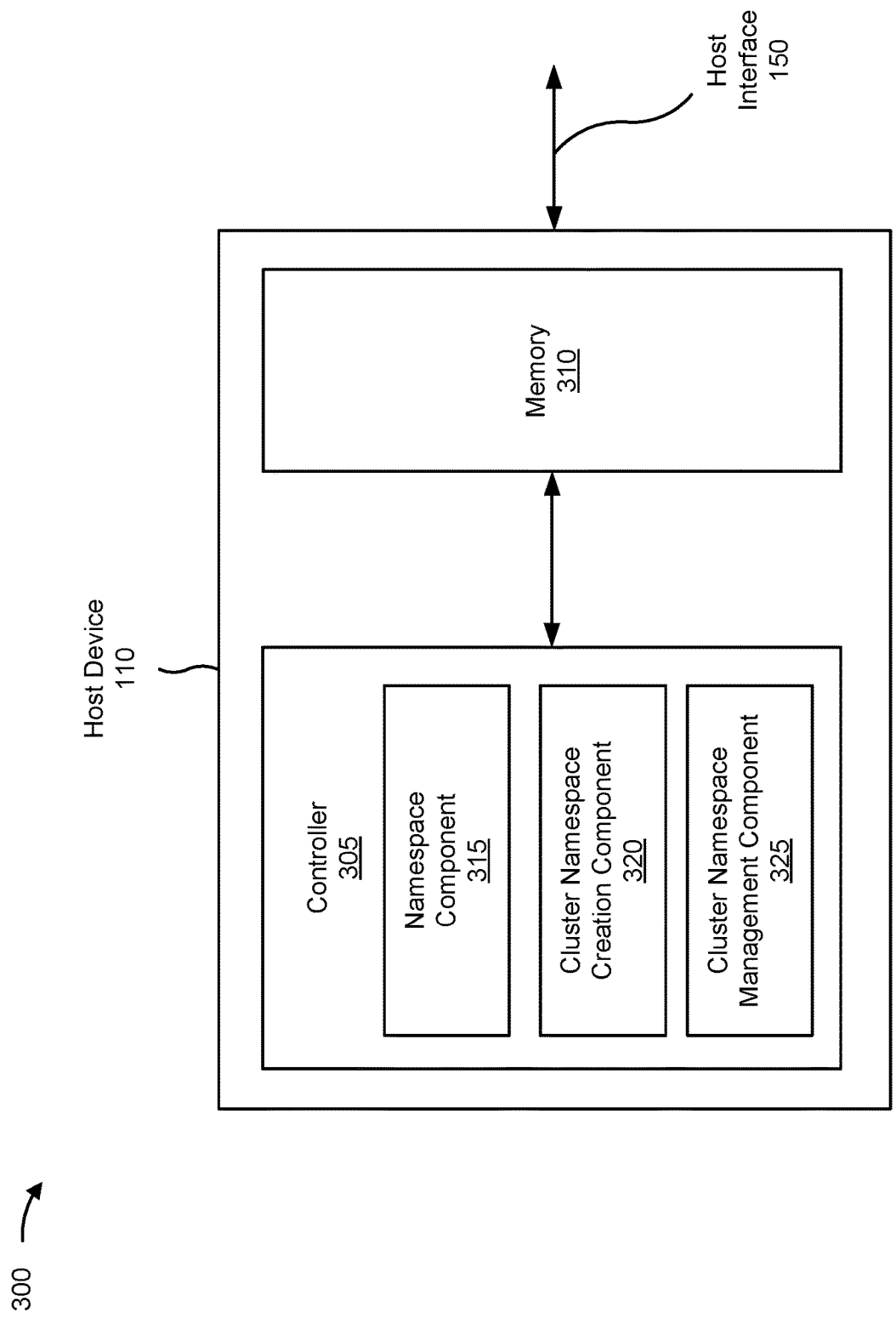
FIG. 3 is a diagram of example components included in a host device.

FIG. 3 is a diagram of example components 300 included in a host device 110. The host device 110 may include a controller 305 and memory 310. The controller 305 associated with the host device 110 may include some or all of the features of the controller 130 associated with the memory device 120. Additionally, or alternatively, the memory 310 associated with the host device 110 may include some or all of the features of the memory 140 associated with the memory device 120.

The controller 305 may control operations of the memory 310, such as by executing one or more instructions. For example, the host device 110 may store one or more instructions in the memory 310, and the controller 305 may execute those one or more instructions. Additionally, or alternatively, the controller 305 may receive one or more instructions from the memory device 120 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 305. The controller 305 may execute the set of instructions to perform one or more operations or methods described herein. In some implementations, execution of the set of instructions, by the controller 305, causes the controller 305 and/or the host device 110 to perform one or more operations or methods described herein. In some implementations, hardwired circuitry is used instead of or in combination with the one or more instructions to perform one or more operations or methods described herein. Additionally, or alternatively, the controller 305 and/or one or more components of the host device 110 may be configured to perform one or more operations or methods described herein.

As shown in FIG. 3, the controller 305 may include a namespace component 315, a cluster namespace creation component 320, and/or a cluster namespace management component 325. In some implementations, one or more of these components are implemented as one or more instructions (e.g., firmware) executed by the controller 305. Alternatively, one or more of these components may be implemented as dedicated integrated circuits distinct from the controller 305.

The namespace component 315 may be configured to create one or more namespaces and/or to manage one or more namespaces associated with the memory device 120. Specifically, the namespace component 315 may be configured to instruct the memory device 120 and/or the namespace component 230 to create a namespace having one or more characteristics. For example, the namespace component 315 may identify a size to be used for a namespace, and may transmit an instruction that instructs the memory device 120 and/or the namespace component 230 to create the namespace having the identified size. In some cases, the namespace component 315 may determine an identifier associated with the namespace. Additionally, or alternatively, the namespace component 315 may receive an identifier associated with the namespace from the memory device 120.

The cluster namespace creation component 320 may be configured to create one or more cluster namespaces. Specifically, the cluster namespace creation component 320 may be configured to instruct the memory device 120 and/or the cluster namespace component 235 to create the one or more cluster namespaces. In some cases, the cluster namespace creation component 320 may determine one or more characteristics of a cluster namespace. For example, the cluster namespace creation component 320 may determine that a first cluster namespace associated with a first application (such as a music application) of the host device 110 should have a first size (e.g., a first number of memory resources). The cluster namespace creation component 320 may instruct the memory device 120 and/or the cluster namespace component 235 to create the first cluster namespace having the first size. Additionally, the cluster namespace component 320 may determine that a second cluster namespace associated with a second application (such as a gaming application) of the host device 110 should have a second size (e.g., a second number of memory resources). The cluster namespace creation component 320 may instruct the memory device 120 and/or the cluster namespace component 235 to create the second cluster namespace having the second size. In some cases, the first size of the first cluster namespace may be the same as the second size of the second cluster namespace. In some other cases, the first size of the first cluster namespace may be different than the second size of the second cluster namespace. The first cluster namespace may include memory resources from a first set of namespaces and the second cluster namespace may include memory resources from a second set of namespaces. For example, the first cluster namespace may be associated with first extent(s) that map a first set of LBA ranges from the first set of namespaces to the first cluster namespace, and the second cluster namespace may be associated with second extent(s) that map a second set of LBA ranges from the second set of namespaces to the second cluster namespace. In some cases, the first set of namespaces may be the same as the second set of namespaces. In some other cases, the first set of namespaces may include at least one namespace that is not included in the second set of namespaces. In some cases, host device 110 and/or the cluster namespace creation component 320 may indicate which namespaces are to be used for creating the cluster namespace. Additionally, or alternatively, the memory device 120 and/or the cluster namespace component 235 may determine which namespaces are to be used for creating the cluster namespace. In some cases, the cluster namespace component 320 may determine an identifier associated with the cluster namespace, and may transmit an indication of the cluster namespace identifier to the memory device 120. Additionally, or alternatively, cluster namespace component 235 may determine an identifier associated with the cluster namespace, and may transmit an indication of the cluster namespace identifier to the host device 110.

The cluster namespace management component 325 may be configured to manage the one or more cluster namespaces. In some cases, the cluster namespace management component 325 may be configured to delete a cluster namespace. For example, the cluster namespace management component 325 may determine a cluster namespace that is to be deleted, and may transmit an instruction that instructs the memory device 120 to delete the cluster namespace. In some cases, the cluster namespace management component 325 may be configured to adjust a cluster namespace, such as to change a size of the cluster namespace. For example, the cluster namespace management component 325 may determine to increase a number of memory resources associated with the cluster namespace or to decrease a number of memory resources associated with the cluster namespace, and may transmit an instruction that instructs the memory device 120 to increase the number of memory resources or decrease the number of memory resources. Additional details are described below.

One or more devices or components shown in FIG. 3 may be configured to perform operations described elsewhere herein, such as one or more operations and/or methods described in connection with FIG. 5. For example, the controller 305, the namespace component 315, the cluster namespace creation component 320, and/or the cluster namespace management component 325 may be configured to perform one or more operations and/or methods for the host device 110.

The number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of components (e.g., one or more components) shown in FIG. 3 may perform one or more operations described as being performed by another set of components shown in FIG. 3.

As indicated above, FIG. 3 is provided as an example. Other examples may differ from what is described with regard to FIG. 3.

Figure 4:
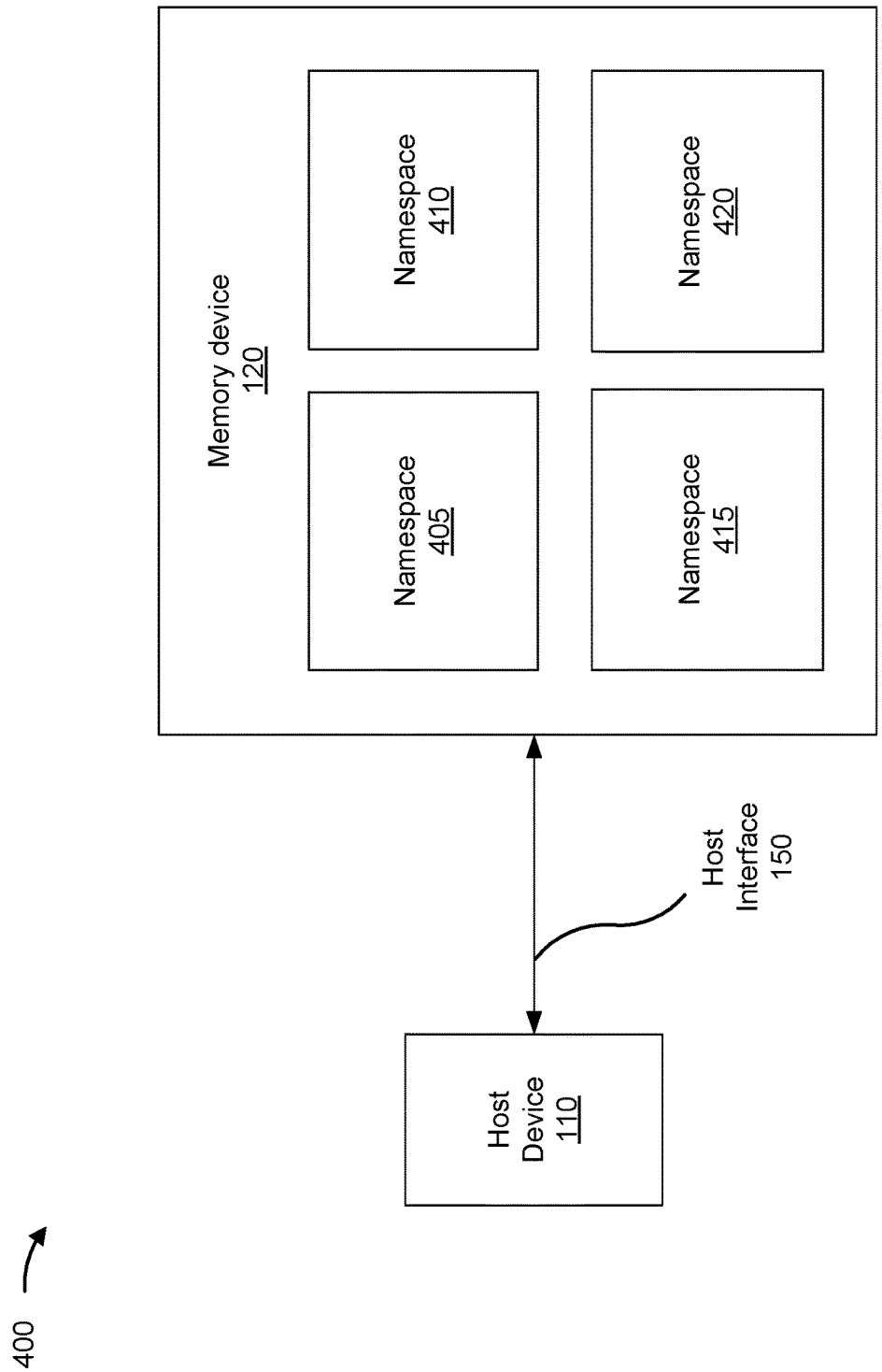
FIG. 4 is a diagram illustrating an example of a namespace configuration.

FIG. 4 is a diagram illustrating an example 400 of a namespace configuration. The memory device 120 may communicate with the host device 110 via the host interface 150. The memory device 120 may be configured with one or more namespaces, such as namespace 405, namespace 410, namespace 415, and namespace 420. In some cases, the memory device 120 may create the one or more namespaces based on an instruction from the host device 110. In some other cases, the memory device 120 may be configured with the one or more namespaces and/or may create the one or more namespaces without instruction from the host device 110. The memory device 120 may have, for example, a 1 terabyte (TB) (e.g., 1024 gigabytes (GB)) storage capacity. For example, the memory device 120 may include memory resources that provide the memory device 120 with the 1 TB storage capacity. In some cases, each namespace may have a 256 GB storage capacity. For example, each namespace may have memory resources that provide the namespace with the 256 GB storage capacity. In some other cases, different namespaces may have different storage capacities and/or different numbers of memory resources.

In some cases, a namespace may be associated with a particular application or function of the host device 110. For example, the host device 110 and/or the memory device 120 may associate the namespace 405 with a music application of the host device 110, the namespace 410 with a gaming application of the host device 110, the namespace 415 with a map application of the host device 110, and the namespace 420 with a camera application of the host device 110. When the host device 110 performs a write operation (or a read operation) associated with the music application, the memory device 120 may store the data (or access the data) associated with the music application in the namespace 405. In some cases, the host device 110 may transmit an instruction that instructs the memory device 120 to store the data as music application data. Additionally, or alternatively, the host device 110 may transmit an indication of a namespace identifier associated with the namespace 405 when performing the write operation or the read operation associated with the music application. In another example, when the host device 110 performs a write operation (or a read operation) associated with the gaming application, the memory device 120 may store the data (or access the data) associated with the gaming application in the namespace 410. In some cases, the host device 110 may transmit an instruction that instructs the memory device 120 to store the data as gaming application data. Additionally, or alternatively, the host device 110 may transmit an indication of a namespace identifier associated with the namespace 410 when performing the write operation or the read operation associated with the music application.

In some cases, the host device 110 may require a higher storage capacity (e.g., more memory resources) for a particular application than the memory resources that are available in the namespace associated with that application. For example, the host device 110 may require more than 256 GB of memory resources for the music application of the host device 110. However, the host device 110 may not need 256 GB of memory resources for the gaming application of the host device 110. In another example, a new owner may acquire the host device 110 and/or the memory device 120, and the new owner may not need any memory resources for the gaming application of the host device 110. However, the size of the namespace (e.g., the number of memory resources that available in the namespace) may not be able to be adjusted. This may result in the host device 110 not being able to use a particular application or perform a particular function due to the limited memory resources associated with that application or function. Additionally, or alternatively, this may result in additional memory resources needing to be added to the memory device 120. As a result, memory resources may be wasted, such as memory resources associated with namespaces that are not being used, and a size of the host device 110 and/or the memory device 120 may need to be increased to accommodate the additional memory resources. For at least these reasons, memory devices that include namespaces having a fixed (non-adjustable) number of memory resources may be problematic.

As indicated above, FIG. 4 is provided as an example. Other examples may differ from what is described with regard to FIG. 4.

Figure 5:
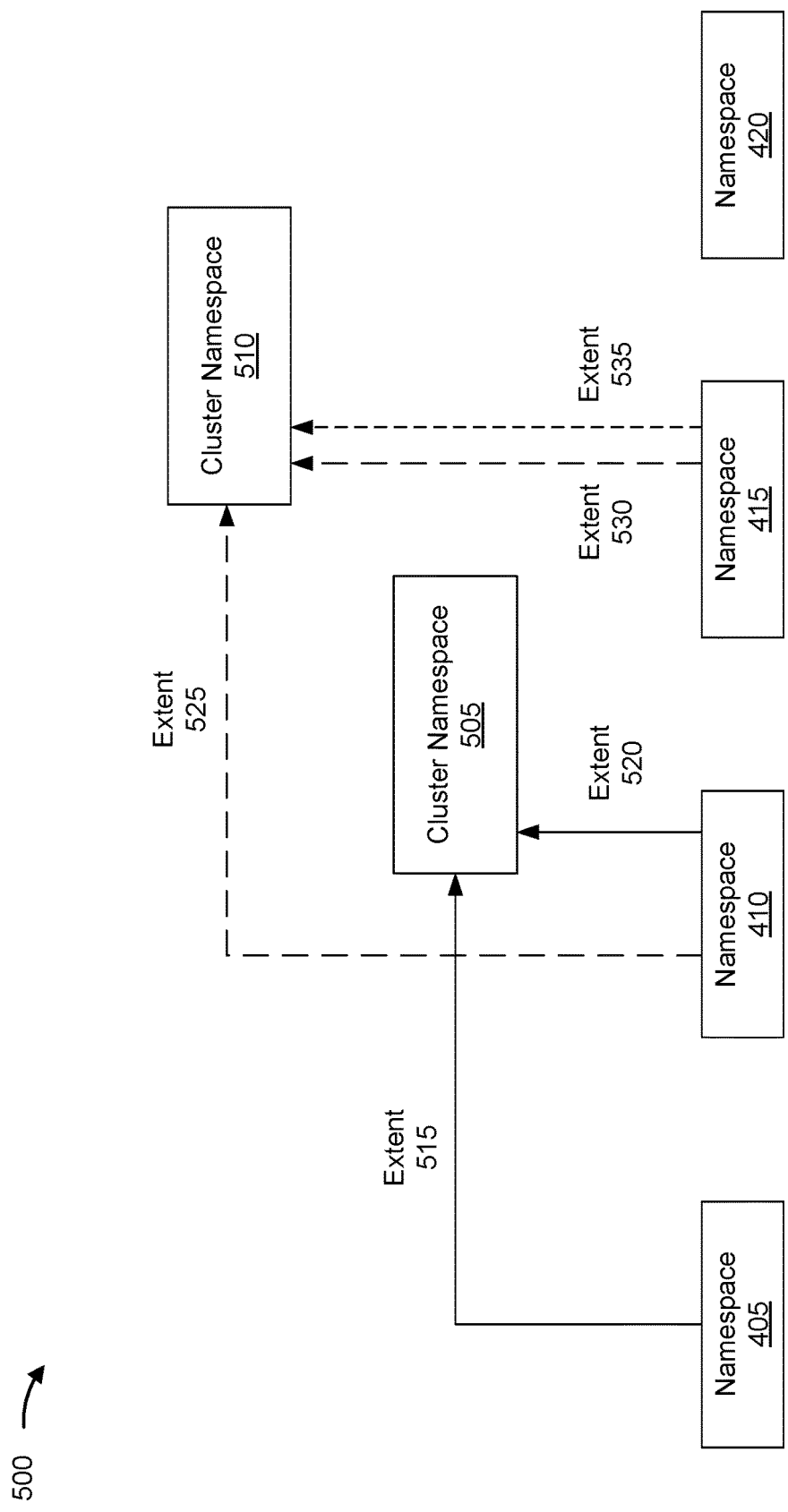
FIG. 5 is a diagram illustrating an example of a cluster namespace for a memory device.

FIG. 5 is a diagram illustrating an example 500 of a cluster namespace for a memory device. The host device 110 and/or the memory device 120 may create one or more cluster namespaces. A cluster namespace may be a quantity of non-volatile memory of the memory device 120 that includes memory resources from one or more namespaces. For example, a cluster namespace may include memory resources that are spread across multiple namespaces.

In some implementations, the host device 110 and/or the memory device 120 may create the cluster namespace 505. For example, the host device 110 may transmit an instruction that instructs the memory device 120 to create the cluster namespace 505. The cluster namespace 505 may be associated with a particular application or function of the host device 110. For example, the cluster namespace 505 may be associated with a music application of the host device 110. In some implementations, the host device 110 may determine a size of the cluster namespace 505, and may transmit an instruction to the memory device 120 that indicates the size of the cluster namespace 505. For example, the host device 110 may determine that the cluster namespace 505 should have an 80 GB storage capacity, and may transmit an instruction to the memory device 120 that instructs the memory device 120 to create the cluster namespace 505 having the 80 GB storage capacity. In some implementations, the host device 110 may indicate one or more namespaces from which memory resources are to be allocated. For example, the host device 110 may transmit an instruction that instructs the memory device 120 to create the cluster namespace 505 using memory resources from namespace 405 and namespace 410. Specifically, the host device 110 may indicate the amount of memory resources that are to be allocated from each namespace. For example, the host device 110 may transmit an instruction that instructs the memory device 120 to use 40 GB from namespace 405 and 40 GB from namespace 410 to create the cluster namespace 505, or may transmit an instruction that instructs the memory device 120 to use 30 GB from namespace 405 and 50 GB from namespace 410 to create the cluster namespace 505. The memory device 120 may create the cluster namespace 505 having the 80 GB storage capacity based on the instruction from the host device 110. In some implementations, creating the cluster namespace 505 may include creating one or more extents. For example, the memory device 120 may create an extent 515 that maps a set of LBA ranges from the namespace 405 to the cluster namespace 505. The extent 515 that maps the set of LBA ranges from the namespace 405 to the cluster namespace 505 may map a set of LBA ranges that corresponds to a 40 GB (or 30 GB) storage capacity. Additionally, the memory device 120 may create an extent 520 that maps a set of LBA ranges from the namespace 410 to the cluster namespace 505. The extent 520 that maps the set of LBA ranges from the namespace 410 to the cluster namespace 505 may map a set of LBA ranges that corresponds to a 40 GB (or 50 GB) storage capacity. In some implementations, the cluster namespace 505 may be associated with an identifier. For example, the memory device 120 may determine an identifier associated with the cluster namespace 505 and may transmit an indication of the identifier associated with the cluster namespace 505 to the host device 110. Additionally, or alternatively, the host device 110 may determine the identifier associated with the cluster namespace 505 and may transmit an indication of the identifier associated with the cluster namespace 505 to the memory device 120.

In some implementations, the host device 110 and/or the memory device 120 may create the cluster namespace 510. For example, the host device 110 may transmit an instruction that instructs the memory device 120 to create the cluster namespace 510. The cluster namespace 510 may be associated with a particular application or function of the host device 110. For example, the cluster namespace 510 may be associated with a gaming application of the host device 110. In some implementations, the host device 110 may determine a size of the cluster namespace 510, and may transmit an instruction to the memory device 120 that indicates the size of the cluster namespace 510. For example, the host device 110 may determine that the cluster namespace 510 should have a 40 GB storage capacity, and may transmit an instruction that instructs the memory device 120 to create the cluster namespace 510 having the 40 GB storage capacity. In some implementations, the host device 110 may indicate one or more namespaces from which memory resources are to be allocated. For example, the host device 110 may transmit an instruction that instructs the memory device 120 to create the cluster namespace 510 using memory resources from namespace 410 and namespace 415. Specifically, the host device 110 may indicate the amount of memory resources that are to be allocated from each namespace. For example, the host device 110 may transmit an instruction that instructs the memory device 120 to use 20 GB from namespace 410 and 20 GB from namespace 415 to create the cluster namespace 510. The memory device 120 may create the cluster namespace 510 having the 40 GB storage capacity based on the instruction from the host device 110. In some implementations, creating the cluster namespace 510 may include creating one or more extents. For example, the memory device 120 may create an extent 525 that maps a set of LBA ranges from the namespace 410 to the cluster namespace 510. The extent 525 that maps the set of LBA ranges from the namespace 410 to the cluster namespace 510 may map a set of LBA ranges that corresponds to a 20 GB storage capacity. Additionally, the memory device 120 may create an extent 530 that maps a set of LBA ranges from the namespace 415 to the cluster namespace 510. The extent 530 that maps the set of LBA ranges from the namespace 415 to the cluster namespace 510 may map a set of LBA ranges that corresponds to a 20 GB storage capacity. In some implementations, the cluster namespace 510 may be associated with an identifier. For example, the memory device 120 may determine an identifier associated with the cluster namespace 510 and may transmit an indication of the identifier associated with the cluster namespace 510 to the host device 110. Additionally, or alternatively, the host device 110 may determine the identifier associated with the cluster namespace 510 and may transmit an indication of the identifier associated with the cluster namespace 510 to the memory device 120.

In some implementations, a namespace may not be associated with any cluster namespaces. For example, memory resources from the namespace 420 may not be allocated to either of the cluster namespace 505 or the cluster namespace 510. The host device 110 and/or the memory device 120 may not use memory resources from the namespace 420 based on not enough memory resources being available from the namespace 420 and/or based on one or more restrictions associated with the namespace 420, among other examples.

In some implementations, there may be a minimum number of memory resources (e.g., a minimum granularity) that can be used for creating or adjusting a cluster namespace. In one example, the granularity may be 1 GB. In this example, the host device 110 and/or the memory device 120 may be configured to allocate memory resources from a namespace to a cluster namespace in 1 GB increments (e.g., 1 GB, 2 GB, 3 GB, etc.). For example, the extent 515 may allocate memory resources from the namespace 405 to the cluster namespace 505 in 1 GB increments and the extent 520 may allocate memory resources from the namespace 410 to the cluster namespace 505 in 1 GB increments. In another example, the granularity may be 10 GB. In this example, the host device 110 and/or the memory device 120 may be configured to allocate memory resources from a namespace to a cluster namespace in 10 GB increments (e.g., 10 GB, 20 GB, 30 GB, etc.). For example, the extent 515 may allocate memory resources from the namespace 405 to the cluster namespace 505 in 10 GB increments and the extent 520 may allocate memory resources from the namespace 410 to the cluster namespace 505 in 10 GB increments. In some implementations, the granularity may be system-wide. For example, every cluster namespace and/or every namespace may be configured to use the same granularity. In some implementations, the granularity may be namespace specific. For example, the namespace 405 may be associated with a first namespace granularity (such as 2 GB) and the namespace 410 may be associated with a second namespace granularity (such as 4 GB). In some implementations, the granularity may be cluster namespace specific. For example, the cluster namespace 505 may be associated with a first cluster namespace granularity (such as 5 GB) and the cluster namespace 510 may be associated with a second cluster namespace granularity (such as 8 GB).

In some implementations, the cluster namespaces may be adjustable. For example, a size of the cluster namespace, such as a storage capacity of the cluster namespace and/or a number of memory resources allocated to the cluster namespace, may be able to be adjusted by the host device 110 and/or the memory device 120. In one example, an initial configuration of the cluster namespace 510 may include 20 GB of memory resources from namespace 410 (extent 525) and 20 GB of memory resources from namespace 415 (extent 530). However, the host device 110 (or a user of the host device 110) may determine that a greater storage capacity is needed. For example, the host device 110 may determine that more than 40 GB of storage capacity are needed for the gaming application of the host device 110. In this case, the host device 110 may instruct the memory device 120 to add more memory resources to the cluster namespace 510 associated with the gaming application of the host device 110. For example, the host device 110 may instruct the memory device 120 to increase the storage capacity of the cluster namespace 510 by 30 GB. In some implementations, the memory device 120 may adjust an existing extent, such as the extent 530. For example, the memory device 120 may increase the extent 530 from allocating 20 GB of memory resources from the namespace 415 to allocating 50 GB of memory resources from the namespace 415. In some implementations, the memory device 120 may create a new extent. The new extent may be an extent from a namespace that is already associated with the cluster namespace 510 or may be an extent from a namespace that is not currently associated with the cluster namespace 510. For example, the new extent may be the extent 535 that allocates an additional 30 GB of memory resources from namespace 415. Thus, the cluster namespace 510 to be used for the gaming application of the host device 110 may be associated with a first extent 525 that allocates 20 GB of memory resources from the namespace 410 to the cluster namespace 510, a second extent 530 that allocates 20 GB of memory resources from the namespace 415 to the cluster namespace 510, and a third extent 535 that allocates 30 GB of memory resources from the namespace 415 to the cluster namespace 510.

In some implementations, the host device 110 and/or the memory device 120 may reduce the storage capacity of a cluster namespace. For example, the host device 110 (or the user of the host device 110) may determine that less than 40 GB of memory resources are needed for the gaming application of the host device 110. In this case, the host device 110 may instruct the memory device 120 to reduce the storage capacity of the cluster namespace 510. For example, the host device 110 may instruct the memory device 120 to decrease the number of memory resources that are allocated to the cluster namespace 510 by 10 GB. The memory device 120 may reduce the number of memory resources allocated to the cluster namespace 510 based on the instruction from the host device 110. For example, the memory device 120 may decrease the extent 525 from allocating 20 GB of memory resources from the namespace 410 to allocating 10 GB of memory resources from the namespace 410. In some implementations, the host device 110 and/or the memory device 120 may delete one or more extents. For example, the host device 110 may transmit an instruction that instructs the memory device 120 to delete extent 520 associated with cluster namespace 505. In this case, the memory resources associated with the cluster namespace 505 may decrease from 40 GB (20 GB from namespace 405 and 20 GB from namespace 410) to 20 GB (from namespace 405 only).

In some implementations, the host device 110 may write data to one or more cluster namespaces and/or may read data from the one or more cluster namespaces. For example, the host device 110, when using the music application, may read data from the cluster namespace 505 and/or may write data to the cluster namespace 505. The host device 110 may be able to determine an amount of available storage associated with the cluster namespace 505. For example, the host device 110 may determine that the cluster namespace 505 has a total storage capacity of 40 GB and that 25 GB of the 40 GB are available to be used. In some implementations, the host device 110 may not be able to write directly to the individual namespaces (such as the namespace 405) or to read directly from the individual namespaces. Instead, the host device 110 may instruct the memory device 120 to perform a write operation or a read operation associated with the cluster namespace 505, and the memory device 120 may perform the data mapping between the cluster namespace 505 and the individual namespaces.

In some implementations, a drive associated with the memory device 120 (and/or the host device 110) may be configured to support cluster namespace capabilities. The drive may report the capability of the memory device 120 to support the cluster namespace, the extent granularity, a maximum number of extents per cluster namespace, and/or a maximum number of cluster namespaces that are supported, among other examples. The drive may support the ability to identify cluster namespaces and to support various cluster namespaces. In some cases, cluster namespace management commands may be enabled to support adding cluster namespaces, deleting cluster namespaces, adding extents to the cluster namespace, and/or deleting extents to the cluster namespace. The drive may support formatting non-volatile memory for cluster namespace capabilities. In some cases, the drive may support cluster namespaces across endurance groups and/or may support security features at the cluster namespace level (e.g., similar to the security features that exist at the namespace level).

The techniques described herein enable cluster namespace configuration and adjustment. Cluster namespaces may enable simpler memory device design since system engineers may not have to determine a size of the namespaces during a design stage. The adaptive cluster namespace size may be based on actual usage by an application or user of the host device 110. For example, the cluster namespace may allow users and system designers the flexibility to dynamically increase or decrease the cluster namespace size based on the actual usage. Additionally, minimal (or no) driver level changes may be required to support the cluster namespace capabilities, since administrative commands can be used to configure the cluster namespace and, once configured, the cluster namespace may appear as a regular namespace to the host device 110.

Figure 6:
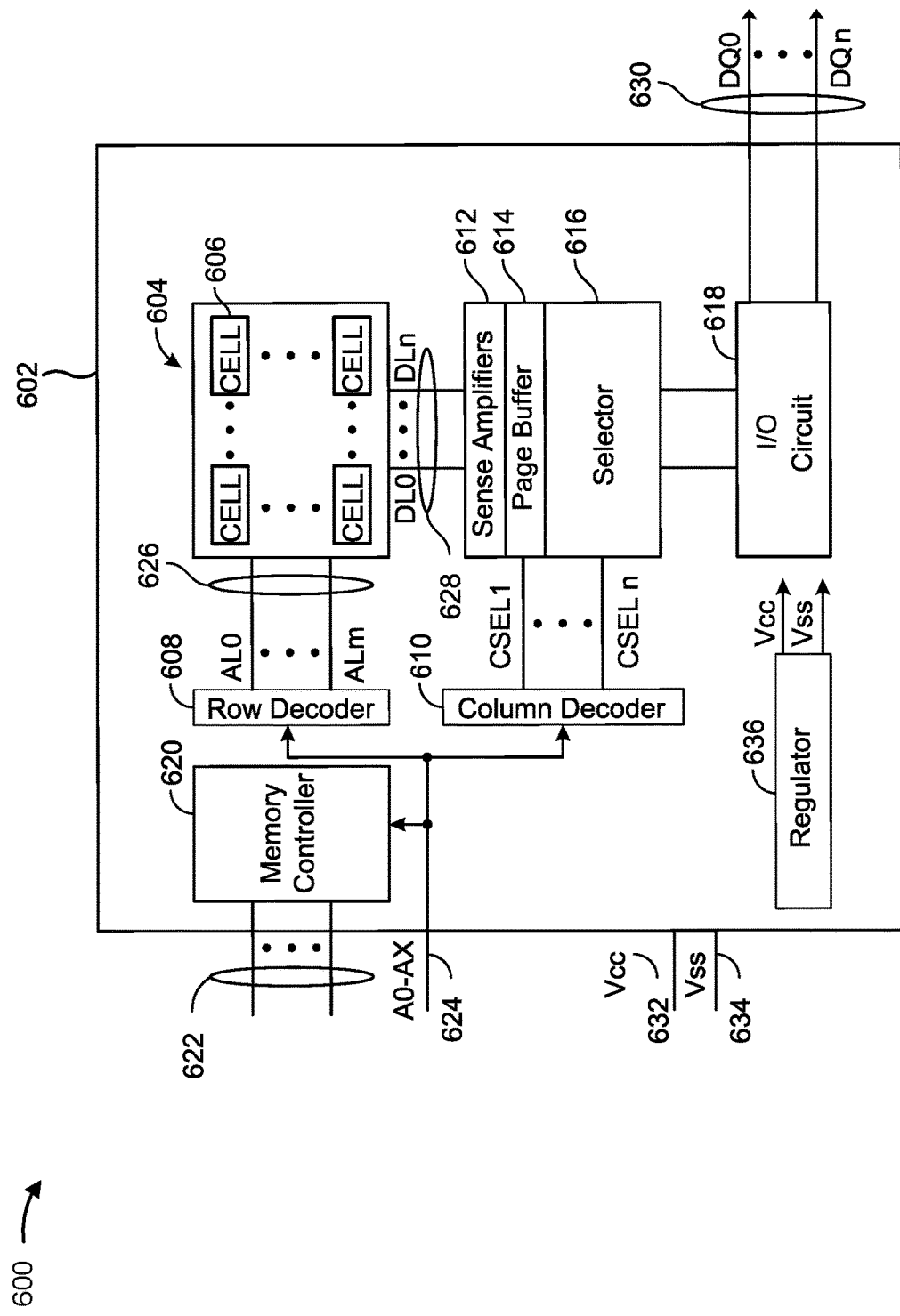
FIG. 6 is a diagram illustrating an example of components included in a memory device.

FIG. 6 is a diagram illustrating an example 600 of components included in a memory device 602. The memory device 602 may be the memory device 120. The memory device 602 may include a memory array 604 having multiple memory cells 606. The memory device 602 may include one or more components (e.g., circuits) to transmit signals to or perform memory operations on the memory array 604. For example, the memory device 602 may include a row decoder 608, a column decoder 610, one or more sense amplifiers 612, a page buffer 614, a selector 616, an input/output (I/O) circuit 618, and a memory controller 620. The memory controller 620 may be the controller 130.

The memory controller 620 may control memory operations of the memory device 602 according to one or more signals received via one or more control lines 622, such as one or more clock signals or control signals that indicate an operation (e.g., write, read, or erase) to be performed. Additionally, or alternatively, the memory controller 620 may determine one or memory cells 606 upon which the operation is to be performed based on one or more signals received via one or more address lines 624, such as one or more address signals (shown as A0-AX). A host device external from the memory device 602 may control the values of the control signals on the control lines 622 and/or the address signals on the address line 624.

The memory device 602 may use access lines 626 (sometimes called word lines or row lines, and shown as AL0-ALm) and data lines 628 (sometimes called digit lines, bit lines, or column lines, and shown as DL0-DLn) to transfer data to or from one or more of the memory cells 606. For example, the row decoder 608 and the column decoder 610 may receive and decode the address signals (A0-AX) from the address line 624 and may determine which of the memory cells 606 are to be accessed based on the address signals. The row decoder 608 and the column decoder 610 may provide signals to those memory cells 606 via one or more access lines 626 and one or more data lines 628, respectively.

For example, the column decoder 610 may receive and decode address signals into one or more column select signals (shown as CSEL1-CSELn). The selector 616 may receive the column select signals and may select data in the page buffer 614 that represents values of data to be read from or to be programmed into memory cells 606. The page buffer 614 may be configured to store data received from a host device before the data is programmed into relevant portions of the memory array 604, or the page buffer 614 may store data read from the memory array 604 before the data is transmitted to the host device. The sense amplifiers 612 may be configured to determine the values to be read from or written to the memory cells 606 using the data lines 628. For example, in a selected string of memory cells 606, a sense amplifier 612 may read a logic level in a memory cell 606 in response to a read current flowing through the selected string to a data line 628. The I/O circuit 618 may transfer values of data into or out of the memory device 602 (e.g., to or from a host device), such as into or out of the page buffer 614 or the memory array 604, using I/O lines 630 (shown as (DQ0-DQn)).

The memory controller 620 may receive positive and negative supply signals, such as a supply voltage (Vcc) 632 and a negative supply (Vss) 634 (e.g., a ground potential), from an external source or power supply (e.g., an internal battery, an external battery, and/or an AC-to-DC converter). In some implementations, the memory controller 620 may include a regulator 636 to internally provide positive or negative supply signals.

Figure 7:
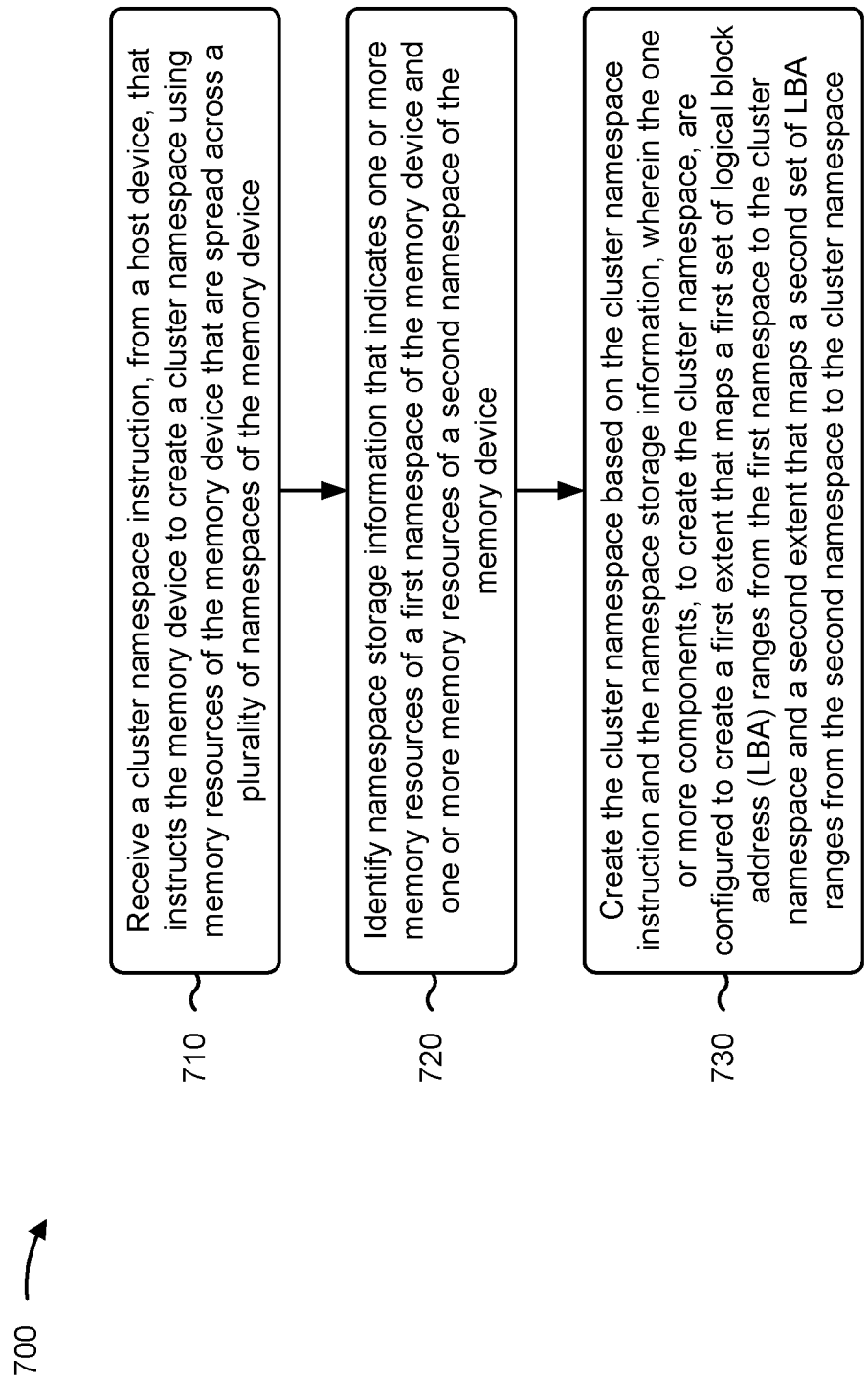
FIG. 7 is a flowchart of an example method associated with a cluster namespace for a memory device.
Figure 8:
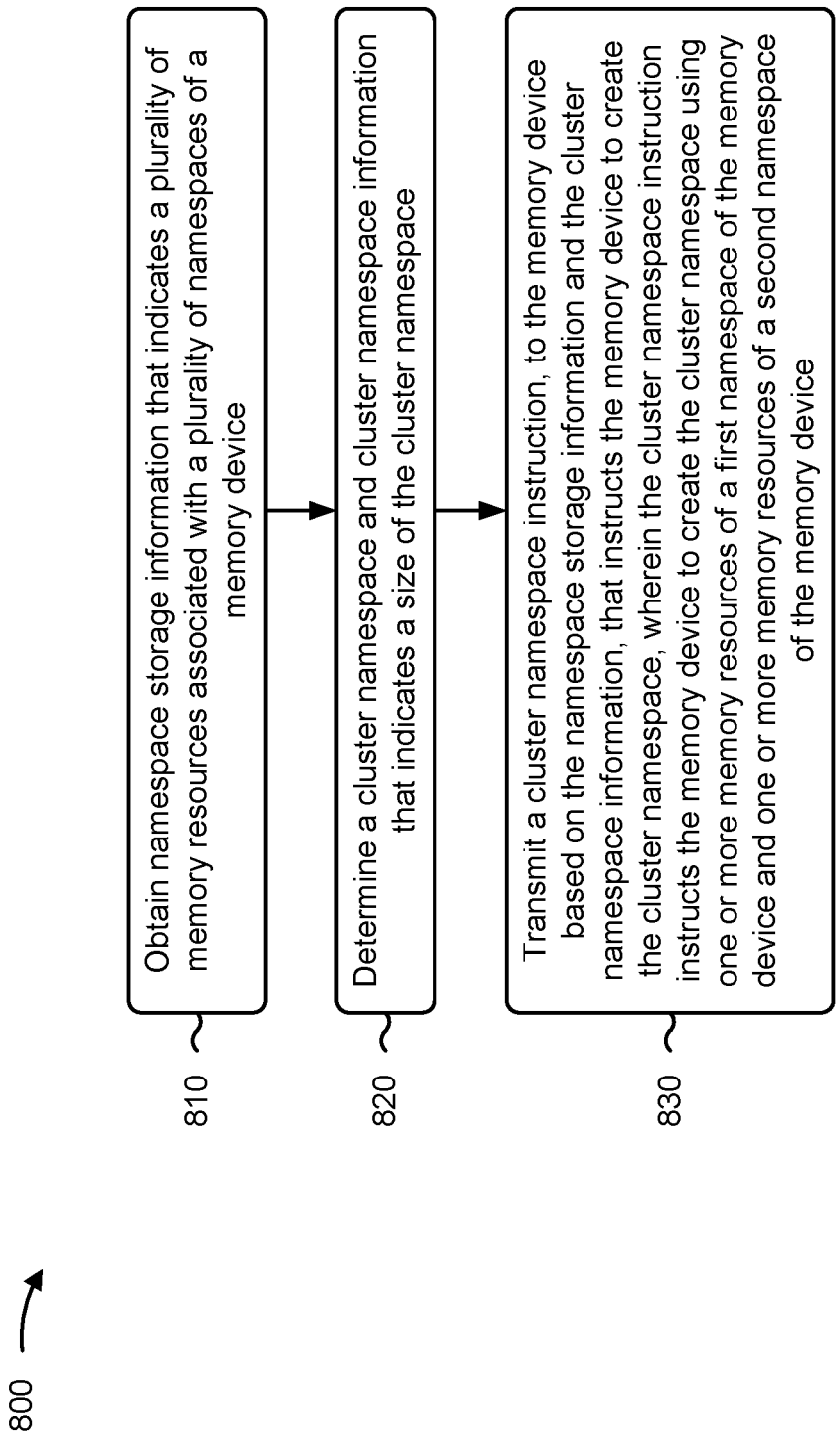
FIG. 8 is a flowchart of an example method associated with a cluster namespace for a memory device.
Figure 9:
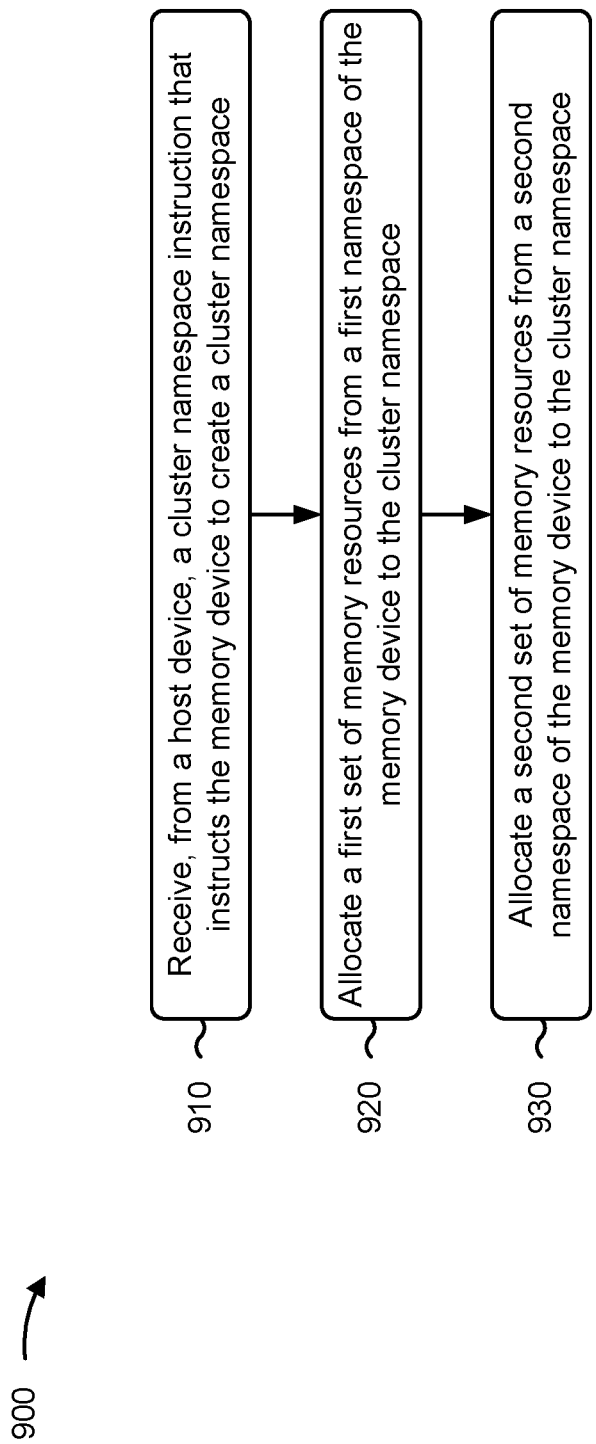
FIG. 9 is a flowchart of an example method associated with a cluster namespace for a memory device.

One or more devices or components shown in FIG. 6 may be used to carry out operations described elsewhere herein, such as one or more operations of FIG. 5 and/or one or more process blocks of the methods of FIGS. 7-9.

As indicated above, FIG. 6 is provided as an example. Other examples may differ from what is described with regard to FIG. 6.

FIG. 7 is a flowchart of an example method 700 associated with a cluster namespace for a memory device. In some implementations, a memory device (e.g., the memory device 120) may perform or may be configured to perform the method 700. In some implementations, another device or a group of devices separate from or including the memory device (e.g., the system 100) may perform or may be configured to perform the method 700. Additionally, or alternatively, one or more components of the memory device (e.g., the controller 130, the memory management component 225, namespace component 230, and/or cluster namespace component 235) may perform or may be configured to perform the method 700. Thus, means for performing the method 700 may include the memory device and/or one or more components of the memory device. Additionally, or alternatively, a non-transitory computer-readable medium may store one or more instructions that, when executed by the memory device (e.g., the controller 130 of the memory device 120), cause the memory device to perform the method 700.

As shown in FIG. 7, the method 700 may include receiving a cluster namespace instruction, from a host device, that instructs the memory device to create a cluster namespace using memory resources of the memory device that are spread across a plurality of namespaces of the memory device (block 710). As further shown in FIG. 7, the method 700 may include identifying namespace storage information that indicates one or more memory resources of a first namespace of the memory device and one or more memory resources of a second namespace of the memory device (block 720). As further shown in FIG. 7, the method 700 may include creating the cluster namespace based on the cluster namespace instruction and the namespace storage information, wherein the one or more components, to create the cluster namespace, are configured to create a first extent that maps a first set of LBA ranges from the first namespace to the cluster namespace and a second extent that maps a second set of LBA ranges from the second namespace to the cluster namespace (block 730).

The method 700 may include additional aspects, such as any single aspect or any combination of aspects described below and/or described in connection with one or more other methods or operations described elsewhere herein.

In a first aspect, the cluster namespace instruction instructs the memory device to create the cluster namespace using the one or more memory resources of the first namespace and the one or more memory resources of the second namespace.

In a second aspect, alone or in combination with the first aspect, the cluster namespace instruction indicates a quantity of memory resources to be used for the cluster namespace.

In a third aspect, alone or in combination with one or more of the first and second aspects, the memory device includes a plurality of cluster namespaces, each cluster namespace of the plurality of cluster namespaces corresponding to an application or a function of the host device.

In a fourth aspect, alone or in combination with one or more of the first through third aspects, the cluster namespace is associated with at least two extents that map different LBA ranges from a same namespace to the cluster namespace.

In a fifth aspect, alone or in combination with one or more of the first through fourth aspects, the memory device includes a plurality of namespaces, and the cluster namespace includes memory resources from a set of namespaces that contains fewer namespaces than the plurality of namespaces.

In a sixth aspect, alone or in combination with one or more of the first through fifth aspects, a size of the first extent and a size of the second are based on an extent granularity or an integer multiple of the extent granularity.

In a seventh aspect, alone or in combination with one or more of the first through sixth aspects, the cluster namespace is configured to be used by a plurality of host devices.

In an eighth aspect, alone or in combination with one or more of the first through seventh aspects, the method 700 includes receiving, from the host device, a cluster namespace release instruction that instructs the memory device to release the cluster namespace, and releasing the cluster namespace, wherein the one or more components, to release the cluster namespace, are configured to delete the first extent that maps the first set of LBA ranges from the first namespace to the cluster namespace and the second extent that maps the second set of LBA ranges from the second namespace to the cluster namespace.

In a ninth aspect, alone or in combination with one or more of the first through eighth aspects, the method 700 includes receiving, from the host device, a cluster namespace adjust instruction that instructs the memory device to adjust a size of the cluster namespace, and adjusting the size of the cluster namespace, wherein the one or more components, to adjust the size of the cluster namespace, are configured to increase or decrease at least one of the first set of LBA ranges or the second set of LBA ranges.

In a tenth aspect, alone or in combination with one or more of the first through ninth aspects, the method 700 includes receiving, from the host device, a write command that instructs the memory device to write data to the cluster namespace, and writing the data to the cluster namespace, wherein the one or more components, to write the data to the cluster namespace, are configured to write a portion of the data to the first set of LBA ranges and another portion of the data to the second set of LBA ranges.

In an eleventh aspect, alone or in combination with one or more of the first through tenth aspects, the one or more components are further configured to obtain configuration information associated with generating the cluster namespace, wherein the configuration information includes one or more of cluster namespace capability information, extent granularity information, maximum number of extents information, or maximum number of cluster namespaces information.

Although FIG. 7 shows example blocks of a method 700, in some implementations, the method 700 may include additional blocks, fewer blocks, different blocks, or differently arranged blocks than those depicted in FIG. 7. Additionally, or alternatively, two or more of the blocks of the method 700 may be performed in parallel. The method 700 is an example of one method that may be performed by one or more devices described herein. These one or more devices may perform or may be configured to perform one or more other methods based on operations described herein.

FIG. 8 is a flowchart of an example method 800 associated with a cluster namespace for a memory device. In some implementations, a host device (e.g., the host device 110) may perform or may be configured to perform the method 800. In some implementations, another device or a group of devices separate from or including the host device (e.g., the system 100) may perform or may be configured to perform the method 800. Additionally, or alternatively, one or more components of the host device (e.g., namespace component 315, cluster namespace creation component 320, and/or cluster namespace management component 325) may perform or may be configured to perform the method 800. Thus, means for performing the method 800 may include the host device and/or one or more components of the host device. Additionally, or alternatively, a non-transitory computer-readable medium may store one or more instructions that, when executed by the host device, cause the host device to perform the method 800.

As shown in FIG. 8, the method 800 may include obtaining namespace storage information that indicates a plurality of memory resources associated with a plurality of namespaces of a memory device (block 810). As further shown in FIG. 8, the method 800 may include determining a cluster namespace and cluster namespace information that indicates a size of the cluster namespace (block 820). As further shown in FIG. 8, the method 800 may include transmitting a cluster namespace instruction, to the memory device based on the namespace storage information and the cluster namespace information, that instructs the memory device to create the cluster namespace, wherein the cluster namespace instruction instructs the memory device to create the cluster namespace using one or more memory resources of a first namespace of the memory device and one or more memory resources of a second namespace of the memory device (block 830).

The method 800 may include additional aspects, such as any single aspect or any combination of aspects described below and/or described in connection with one or more other methods or operations described elsewhere herein.

In a first aspect, the cluster namespace is associated with a first extent that maps a first set of LBA ranges from the first namespace to the cluster namespace and a second extent that maps a second set of LBA ranges from the second namespace to the cluster namespace.

In a second aspect, alone or in combination with the first aspect, the cluster namespace instruction indicates a quantity of memory resources to be used for creating the cluster namespace.

In a third aspect, alone or in combination with one or more of the first and second aspects, each cluster namespace of a plurality of cluster namespaces corresponds to an application or a function of the host device.

In a fourth aspect, alone or in combination with one or more of the first through third aspects, the cluster namespace is associated with at least two extents that map different LBA ranges from a same namespace to the cluster namespace.

In a fifth aspect, alone or in combination with one or more of the first through fourth aspects, the one or more components are further configured to transmit, to the memory device, a cluster namespace release instruction that instructs the memory device to release the cluster namespace.

In a sixth aspect, alone or in combination with one or more of the first through fifth aspects, the one or more components are further configured to transmit, to the memory device, a cluster namespace adjust instruction that instructs the memory device to adjust a size of the cluster namespace.

In a seventh aspect, alone or in combination with one or more of the first through sixth aspects, the one or more components are further configured to transmit, to the memory device, a write command that instructs the memory device to write data to the cluster namespace.

In an eighth aspect, alone or in combination with one or more of the first through seventh aspects, the one or more components are further configured to obtain configuration information associated with generating the cluster namespace, wherein the configuration information includes one or more of cluster namespace capability information, extent granularity information, maximum number of extents information, or maximum number of cluster namespaces information.

Although FIG. 8 shows example blocks of a method 800, in some implementations, the method 800 may include additional blocks, fewer blocks, different blocks, or differently arranged blocks than those depicted in FIG. 8. Additionally, or alternatively, two or more of the blocks of the method 800 may be performed in parallel. The method 800 is an example of one method that may be performed by one or more devices described herein. These one or more devices may perform or may be configured to perform one or more other methods based on operations described herein.

FIG. 9 is a flowchart of an example method 900 associated with a cluster namespace for a memory device. In some implementations, a memory device (e.g., the memory device 120) may perform or may be configured to perform the method 900. In some implementations, another device or a group of devices separate from or including the memory device (e.g., the system 100) may perform or may be configured to perform the method 900. Additionally, or alternatively, one or more components of the memory device (e.g., the controller 130, the memory management component 225, the namespace component 230, and/or the cluster namespace component 235) may perform or may be configured to perform the method 900. Thus, means for performing the method 900 may include the memory device and/or one or more components of the memory device. Additionally, or alternatively, a non-transitory computer-readable medium may store one or more instructions that, when executed by the memory device (e.g., the controller 130 of the memory device 120), cause the memory device to perform the method 900.

As shown in FIG. 9, the method 900 may include receiving, from a host device, a cluster namespace instruction that instructs the memory device to create a cluster namespace (block 910). As further shown in FIG. 9, the method 900 may include allocating a first set of memory resources from a first namespace of the memory device to the cluster namespace (block 920). As further shown in FIG. 9, the method 900 may include allocating a second set of memory resources from a second namespace of the memory device to the cluster namespace (block 930).

The method 900 may include additional aspects, such as any single aspect or any combination of aspects described below and/or described in connection with one or more other methods or operations described elsewhere herein.

In a first aspect, allocating the first set of memory resources from the first namespace to the cluster namespace comprises creating a first extent that maps a first set of LBA ranges from the first namespace to the cluster namespace, and allocating the second set of memory resources from the second namespace to the cluster namespace comprises creating a second extent that maps a second set of LBA ranges from second first namespace to the cluster namespace.

In a second aspect, alone or in combination with the first aspect, the method 900 includes receiving, from the host device, a cluster namespace release instruction that instructs the memory device to release the cluster namespace, and releasing the cluster namespace, wherein releasing the cluster namespace comprises deleting the first extent that maps the first set of LBA ranges from the first namespace to the cluster namespace and the second extent that maps the second set of LBA ranges from the second namespace to the cluster namespace.

In a third aspect, alone or in combination with one or more of the first and second aspects, the method 900 includes receiving, from the host device, a cluster namespace adjust instruction that instructs the memory device to adjust a size of the cluster namespace, and adjusting the size of the cluster namespace, wherein adjusting the size of the cluster namespace comprises increasing or decreasing at least one of the first set of LBA ranges or the second set of LBA ranges.

Although FIG. 9 shows example blocks of a method 900, in some implementations, the method 900 may include additional blocks, fewer blocks, different blocks, or differently arranged blocks than those depicted in FIG. 9. Additionally, or alternatively, two or more of the blocks of the method 900 may be performed in parallel. The method 900 is an example of one method that may be performed by one or more devices described herein. These one or more devices may perform or may be configured to perform one or more other methods based on operations described herein.

In some implementations, a memory device includes one or more components configured to: receive a cluster namespace instruction, from a host device, that instructs the memory device to create a cluster namespace using memory resources of the memory device that are spread across a plurality of namespaces of the memory device; identify namespace storage information that indicates one or more memory resources of a first namespace of the memory device and one or more memory resources of a second namespace of the memory device; and create the cluster namespace based on the cluster namespace instruction and the namespace storage information, wherein the one or more components, to create the cluster namespace, are configured to create a first extent that maps a first set of LBA ranges from the first namespace to the cluster namespace and a second extent that maps a second set of LBA ranges from the second namespace to the cluster namespace.

In some implementations, a host device includes one or more components configured to: obtain namespace storage information that indicates a plurality of memory resources associated with a plurality of namespaces of a memory device; determine a cluster namespace and cluster namespace information that indicates a size of the cluster namespace; and transmit a cluster namespace instruction, to the memory device based on the namespace storage information and the cluster namespace information, that instructs the memory device to create the cluster namespace, wherein the cluster namespace instruction instructs the memory device to create the cluster namespace using one or more memory resources of a first namespace of the memory device and one or more memory resources of a second namespace of the memory device.

In some implementations, a method performed by a memory device includes receiving, from a host device, a cluster namespace instruction that instructs the memory device to create a cluster namespace; allocating a first set of memory resources from a first namespace of the memory device to the cluster namespace; and allocating a second set of memory resources from a second namespace of the memory device to the cluster namespace.

The foregoing disclosure provides illustration and description but is not intended to be exhaustive or to limit the implementations to the precise forms disclosed. Modifications and variations may be made in light of the above disclosure or may be acquired from practice of the implementations described herein.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory device, comprising:
one or more components configured to:
create a plurality of namespaces, wherein each namespace, of the plurality of namespaces, includes a respective quantity of non-volatile memory of the memory device formatted into logical blocks;
receive a cluster namespace instruction from a host device, wherein the cluster namespace instruction indicates instructions for the memory device to create a cluster namespace that includes logical block address (LBA) ranges of respective non-volatile memory from each of the plurality of namespaces, wherein the cluster namespace instruction includes an indication of:
a first set of LBA ranges of the respective non-volatile memory of a first namespace of the plurality of namespaces, and
a second set of LBA ranges of the respective non-volatile memory of a second namespace of the plurality of namespaces; and
create the cluster namespace that includes the first set of LBA ranges and the second set of LBA ranges based on the cluster namespace instruction, wherein the one or more components, to create the cluster namespace, are configured to:
create a first extent that maps, to the cluster namespace, the first set of LBA ranges,
create a second extent that maps, to the cluster namespace, the second set of LBA ranges, and
allocate the first extent and the second extent to the cluster namespace.

2. The memory device of claim 1, wherein the memory device includes a plurality of cluster namespaces that includes the cluster namespace, each cluster namespace of the plurality of cluster namespaces corresponding to an application or a function of the host device.

3. The memory device of claim 1, wherein the cluster namespace is associated with at least two extents that map different LBA ranges from a same namespace to the cluster namespace.

4. The memory device of claim 1, wherein the cluster namespace includes memory resources from a set of namespaces that contains fewer namespaces than the plurality of namespaces.

5. The memory device of claim 1, wherein a size of the first extent and a size of the second extent are based on an extent granularity or an integer multiple of the extent granularity.

6. The memory device of claim 1, wherein the cluster namespace is configured to be used by a plurality of host devices.

7. The memory device of claim 1, wherein the one or more components are further configured to:
receive, from the host device, a cluster namespace release instruction that instructs the memory device to release the cluster namespace; and
release the cluster namespace, wherein the one or more components, to release the cluster namespace, are configured to:
delete the first extent that maps the first set of LBA ranges of the first namespace to the cluster namespace, and
delete the second extent that maps the second set of LBA ranges of the second namespace to the cluster namespace.

8. The memory device of claim 1, wherein the one or more components are further configured to:
receive, from the host device, a cluster namespace adjust instruction that instructs the memory device to adjust a size of the cluster namespace; and
adjust the size of the cluster namespace by increasing or decreasing at least one of the first set of LBA ranges or the second set of LBA ranges.

9. The memory device of claim 8, wherein the one or more components, to adjust the size of the cluster namespace, are configured to:
create a third extent that maps a third set of LBA ranges to the cluster namespace,
wherein the third extent corresponds to the first namespace, the second namespace, or a third namespace of the memory device.

10. The memory device of claim 8, wherein the one or more components, to adjust the size of the cluster namespace, are configured to:
delete the first extent that maps the first set of LBA ranges of the first namespace to the cluster namespace, or
delete the second extent that maps the second set of LBA ranges of the second namespace to the cluster namespace.

11. The memory device of claim 8, wherein the one or more components, to adjust the size of the cluster namespace, are configured to:
increase a quantity of non-volatile memory resources associated with the first extent, or increase a quantity of non-volatile memory resources associated with the second extent to the cluster namespace.

12. The memory device of claim 1, wherein the one or more components are further configured to:
receive, from the host device, a write command that instructs the memory device to write data to the cluster namespace; and
write the data to the cluster namespace,
wherein the one or more components, to write the data, are configured to write a portion of the data to the respective non-volatile memory of the first namespace and another portion of the data to the respective non-volatile memory of the second namespace.

13. The memory device of claim 1, wherein the one or more components are further configured to obtain configuration information associated with generating the cluster namespace, wherein the configuration information includes one or more of cluster namespace capability information, extent granularity information, maximum number of extents information, or maximum number of cluster namespaces information.

14. The memory device of claim 1, wherein the one or more components are further configured to:
receive an additional cluster namespace instruction from the host device, wherein the additional cluster namespace instruction indicates instructions for the memory device to create an additional cluster namespace that includes respective non-volatile memory from two or more namespaces of the plurality of namespaces; and
create the additional cluster namespace that includes the respective non-volatile memories from the two or more namespaces based on the additional cluster namespace instruction, wherein the one or more components, to create the additional cluster namespace, are configured to:
create a third extent that maps, to the additional cluster namespace, a third set of LBA ranges of the respective non-volatile memory of the first namespace,
create a fourth extent that maps, to the additional cluster namespace, a fourth set of LBA ranges of the respective non-volatile memory of a third namespace of the plurality of namespaces, and
allocate the third extent and the fourth extent to the additional cluster namespace.

15. A host device, comprising:
one or more components configured to:
obtain namespace storage information that indicates a plurality of namespaces created by a memory device, wherein each namespace, of the plurality of namespaces, includes a respective quantity of non-volatile memory of the memory device formatted into logical blocks;
determine a cluster namespace that includes logical block address (LBA) ranges of respective non-volatile memory from each of the plurality of namespaces; and
transmit a cluster namespace instruction, to the memory device, that instructs the memory device to create the cluster namespace that includes a first set of LBA ranges, of the respective non-volatile memory of a first namespace of the plurality of namespaces, and a second set of LBA ranges, of the respective non-volatile memory of a second namespace of the plurality of namespaces, wherein the cluster namespace instruction instructs the memory device to:
create a first extent that maps, to the cluster namespace, the first set of LBA ranges,
create a second extent that maps, to the cluster namespace, the second set of LBA ranges, and
allocate the first extent and the second extent to the cluster namespace.

16. The host device of claim 15, wherein each cluster namespace, of a plurality of cluster namespaces of the memory device, corresponds to an application or a function of the host device.

17. The host device of claim 15, wherein the cluster namespace is associated with at least two extents that map different LBA ranges from a same namespace to the cluster namespace.

18. The host device of claim 15, wherein the one or more components are further configured to transmit, to the memory device, a cluster namespace release instruction that instructs the memory device to release the cluster namespace.

19. The host device of claim 15, wherein the one or more components are further configured to transmit, to the memory device, a cluster namespace adjust instruction that instructs the memory device to adjust a size of the cluster namespace.

20. The host device of claim 15, wherein the one or more components are further configured to transmit, to the memory device, a write command that instructs the memory device to write data to the cluster namespace.

21. The host device of claim 15, wherein the one or more components are further configured to obtain configuration information associated with generating the cluster namespace, wherein the configuration information includes one or more of cluster namespace capability information, extent granularity information, maximum number of extents information, or maximum number of cluster namespaces information.

22. A method performed by a memory device, comprising:
creating a plurality of namespaces, wherein each namespace, of the plurality of namespaces, includes a respective quantity of non-volatile memory of the memory device formatted into logical blocks;
receiving, from a host device, a cluster namespace instruction, wherein the cluster namespace instruction indicates instructions for the memory device to create a cluster namespace that includes logical block address (LBA) ranges of respective non-volatile memory from each of the plurality of namespaces,
wherein the cluster namespace instruction includes an indication of:
  a first set of LBA ranges of the respective non-volatile memory of a first namespace of the plurality of namespaces, and
  a second set of LBA ranges of the respective non-volatile memory of a second namespace of the plurality of namespaces; and
creating the cluster namespace that includes the first set of LBA ranges and the second set of LBA ranges based on the cluster namespace instruction, wherein creating the cluster namespace includes:
  creating a first extent that maps, to the cluster namespace, the first set of LBA ranges,
  creating a second extent that maps, to the cluster namespace, the second set of LBA ranges, and
  allocating the first extent and the second extent to the cluster namespace.

23. The method of claim 22, further comprising:
receiving, from the host device, a cluster namespace release instruction that instructs the memory device to release the cluster namespace; and
releasing the cluster namespace,
  wherein releasing the cluster namespace comprises deleting the first extent that maps the first set of LBA ranges of the first namespace to the cluster namespace and the second extent that maps the second set of LBA ranges of the second namespace to the cluster namespace.

24. The method of claim 22, further comprising
receiving, from the host device, a cluster namespace adjust instruction that instructs the memory device to adjust a size of the cluster namespace; and
adjusting the size of the cluster namespace,
  wherein adjusting the size of the cluster namespace comprises increasing or decreasing at least one of the first set of LBA ranges or the second set of LBA ranges.

25. The method of claim 24, wherein adjusting the size of the cluster namespace comprises:
  decreasing a quantity of non-volatile memory resources associated with the first extent, or
  decreasing a quantity of non-volatile memory resources associated with the second extent.

\* \* \* \* \*